United States Patent [19]

Curran et al.

[11] Patent Number: 4,525,599
[45] Date of Patent: Jun. 25, 1985

[54] SOFTWARE PROTECTION METHODS AND APPARATUS

[75] Inventors: Kevin G. Curran, Sudbury; Steven E. Golson, Wayland; Christian S. Rode, Cambridge, all of Mass.

[73] Assignee: General Computer Corporation, Cambridge, Mass.

[21] Appl. No.: 380,771

[22] Filed: May 21, 1982

[51] Int. Cl.³ .............................................. H04L 9/00
[52] U.S. Cl. .............................. 178/22.08; 178/22.09; 364/200
[58] Field of Search ............... 178/22.05, 22.08, 22.09; 364/200, 900; 340/825.34

[56] References Cited

U.S. PATENT DOCUMENTS

| 3,996,449 | 12/1976 | Attanasio et al. | 340/825.34 |
|---|---|---|---|
| 4,120,030 | 10/1978 | Johnstone | 178/22.09 |
| 4,168,396 | 9/1979 | Best | 178/22.09 |
| 4,183,085 | 1/1980 | Roberts et al. | 364/200 |
| 4,246,638 | 1/1981 | Thomas | 364/200 |
| 4,278,837 | 7/1981 | Best | 364/900 |
| 4,306,289 | 12/1981 | Lumley | 364/200 |
| 4,319,079 | 3/1982 | Best | 178/22.09 |
| 4,446,519 | 5/1984 | Thomas | 364/200 |

OTHER PUBLICATIONS

IBM Technical Disclosure Bulletin, vol. 21, No. 2, (7/78), Gurugé, pp. 836–837.

Primary Examiner—Sal Cangialosi
Attorney, Agent, or Firm—Hosier & Sufrin, Ltd.

[57] ABSTRACT

Methods and apparatus are disclosed for inhibiting the unauthorized copying of ROM-resident computer software or the like, for example, the audio-visual display of an electronic video game. A protection circuit including encryption/decryption means is coupled between the microprocessor and the ROM-memory and is operable in a first mode to properly encrypt/decrypt the program information according to a first algorithm and in a second mode to prevent proper encryption/decryption. The address-data buses are monitored by the protection circuit to detect an invalid program event, such as may occur when a microprocessor emulator is used to attempt an unauthorized copying or "dumping" of the program information. Upon detection of the invalid program event or "trap condition", the protection circuit switches to its second operating mode thereby to prevent copying of the decrypted program information.

27 Claims, 4 Drawing Figures

SOFTWARE PROTECTION METHODS AND APPARATUS

BACKGROUND OF THE INVENTION

The present invention relates in general to methods and apparatus for inhibiting the unauthorized copying or "pirating" of computer software. More specifically, the invention finds particular utility in inhibiting the unauthorized copying of the ROM-resident audiovisual display information of electronic video games.

Typically, electronic systems using microprocessors are manufactured with standard small scale or medium scale integration components and standard microprocessors. The system may be duplicated simply by copying the printed circuit board foil pattern and then installing on the copied boards the same standard components as used in the original system. Programmed ROM's are easily duplicated using inexpensive EPROM devices. Those of ordinary skill in the art will recognize that such copying of the system and program involves only the most rudimentary "reverse engineering" procedures. Such copying has been rampant in the coin-operated video game industry. Contraband games have resulted in enormous economic loss to the original game creators and to the authorized manufacturers as well as substantial and unnecessary legal expense in litigation to enjoin the unauthorized reproduction of the copyrighted games.

Copying of the above kind may be impeded by utilizing one or more custom integrated circuits of a type that are not readily duplicated or reverse engineered. A prospective copier would not likely be able to find an off-the-shelf replacement for such custom circuits. However, a modestly ingenious copier would most likely be able to replace the custom component with its functional equivalent by examining the microprocessor program and/or by exercising the custom hardware with a microprocessor emulator to determine its performance parameters.

An essential step in all unauthorized copying schemes is the ability to duplicate the microprocessor program either by dumping the program through use of a microprocessor emulator or by directly duplicating the ROM-resident software. Either of these alternatives is a comparatively simple procedure with state of the art electronic video games.

SUMMARY OF THE INVENTION

It is, therefore, a primary objective of the present invention to inhibit and, as a practical matter, to prohibit the unauthorized copying of computer software information. This result is achieved by encrypting the program information stored in the memory and by implementing encryption/decryption circuitry interposed between the memory and the central processor in a fashion such that any attempt to dump the decrypted program through use of a microprocessor emulator or the like is promptly detected and effectively foreclosed.

During routine system operation, the central processor typically accesses the program ROM in a nonsequential order due to jumps, branches, sub-routine calls, interrupts and the like in the software program. Also, not every address in the ROM memory is typically used in a given program. Stated differently, not every address in the ROM need have valid data.

By contrast, when an attempt is made to copy the computer software using a microprocesor emulator, the ROM memory is normally accessed in a sequential manner and in general every address is accessed. In any event, it is virtually impossible for the emulator even on iterative attempts to access the various memory addresses in the same order as called for by the program software.

In accordance with the methods and apparatus of the present invention, the system is adapted to recognize what is herein defined as a "trap condition". For purposes of the present invention, a "trap condition" is defined as an invalid program event in the sense that such an event would not occur in the ordinary and correct operation of the program software. Such an invalid event may occur, for example, when the emulator accesses an address not used in the program or when it accesses one or more address locations in an order other than that called for by the program. The method and circuitry of the invention is adapted to recognize the invalid program event and to shift the system to a "trap"0 operating mode. The system thereafter will return to the central processor only invalid or incorrect data.

Accordingly, the present invention is directed in one aspect to a method of inhibiting the unauthorized copying of computer software comprising the steps of: (a) storing digital program information in preselected address locations of a memory means in an encrypted form according to a first predetermined algorithm; (b) providing a computer processor for performing preselected functions only in response to the decrypted program information stored in the memory means; (c) coupling the address and data buses of the computer processor to the memory means through an encryption/decryption means selectively operable in a first mode to encrypt/decrypt the program information according to the first predetermined algorithm; (d) monitoring at least one of the address and data buses to detect trap address information; and (e) switching the encryption/decryption means from the first operating mode to the second operating mode if a trap condition is detected by the monitoring means.

Another facet of the invention is directed to a computer system including a central processor for performing preselected functions in response to digital program information stored in encrypted form in a memory means and communicated between the central processor and the memory means on address and data buses. Specifically, in its apparatus form, the present invention is directed to the improvement comprising an encryption/decryption means, coupled between the central processor and the memory means selectively operable in a first mode for encrypting/decrypting the program information according to a first predetermined algorithm and in a second mode for preventing the encryption/decryption of the program information according to the first predetermined algorithm. Detection means are provided for monitoring at least one of the address and data buses to detect an invalid program event in the form of a "trap condition". Switching means shifts the encryption/decryption means from the first operating mode to the second operating mode in response to detection of the invalid program event.

Other aspects of the present invention will be appreciated by those skilled in the art upon reading of the detailed disclosure of the present invention as hereinafter set forth.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
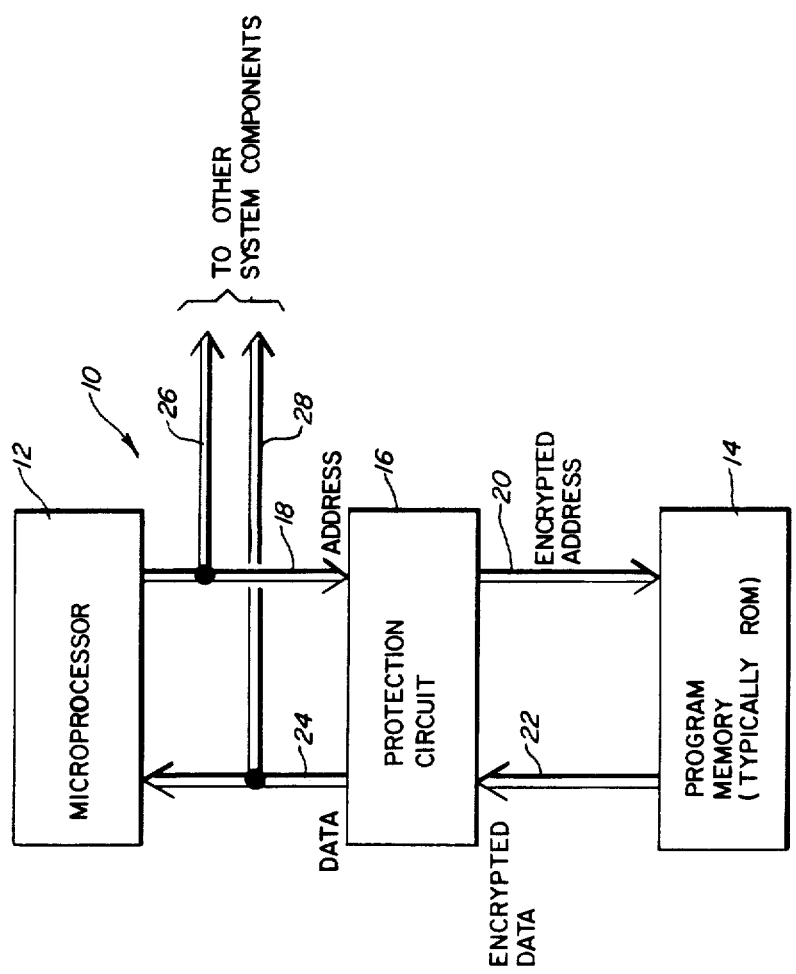
FIG. 1 is a block diagrammatic representation of a computer system including the software protection circuit of the invention interposed between the central processor and the program memory.

Referring now to FIG. 1, there is shown in block diagrammatic form the computer portion 10 of a software driven system, such as a coin operated electronic video game. The computer may comprise a conventional microprocesser 12 and any of a variety of well known memory means 14 for storing digital program information.

In accordance with the present invention, the microprocessor 12 is coupled to the program memory 14 through a protection circuit depicted by the block 16. As will presently be seen, the protection circuit 16 encrypts the address information going to the program memory and decrypts the data coming from the program memory. To this end, an address bus 18 inputs a non-encrypted address location from the microprocessor 12 to the protection circuit 16. An encrypted address bus 20 couples the protection circuit 16 to the program memory 14. Similarly, an encrypted data bus 22 is coupled from the program memory 14 to the protection circuit 16 while the decrypted data bus 24 at the output of circuit 16 is coupled to the microprocessor 12. Address and data buses 26 and 28 are coupled respectively from the address bus 18 and the data bus 24 to other system components such as input/output devices, RAM memory or more ROM memory. The remaining portion of the system is not depicted in detail since its particular construction forms no part of the present invention. Furthermore, it will be understood that the manner in which the illustrated computer may be coupled to various software driven systems such as a coin-operated electronic video game, is familiar to those of ordinary skill in the art.

As will presently be seen, the protection circuit 16 includes encryption/decryption means coupled between the central processor 12 and the memory means 14 and selectively operable in a first mode for encrypting/decrypting the program information according to a first predetermined algorithm. Thus, the program information stored within the memory means 14 is in an encrypted format. Unless the encryption algorithm is known direct copying of the program memory 14 as may be accomplished by any of a number of well-known electronic devices will yield only useless data. However, merely encrypting the data stored in the program memory 14 would not materially impede a would be copier if the decrypted program could be read out of the system by use of a microprocessor emulator in place of the microprocessor 12 or if the protection circuit itself was readily reverse engineerable. To avoid the first possibility it is a feature of the present invention that the encryption/decryption portion of the protection circuit 16 be operable in a second mode for preventing the encryption/decryption of the program information according to the first predetermined algorithm. To effectively foreclose the second possibility, the protection circuit 16 is preferable comprised of an integrated circuit logic array. It is extremely difficult and expensive to reverse engineer a circuit network of any significant complexity that is made in this fashion. Of course, those skilled in the art will recognize that other integrated circuit alternatives may be used to make the protection circuit difficult, if not virtually impossible, to reverse engineer.

Figure 2:
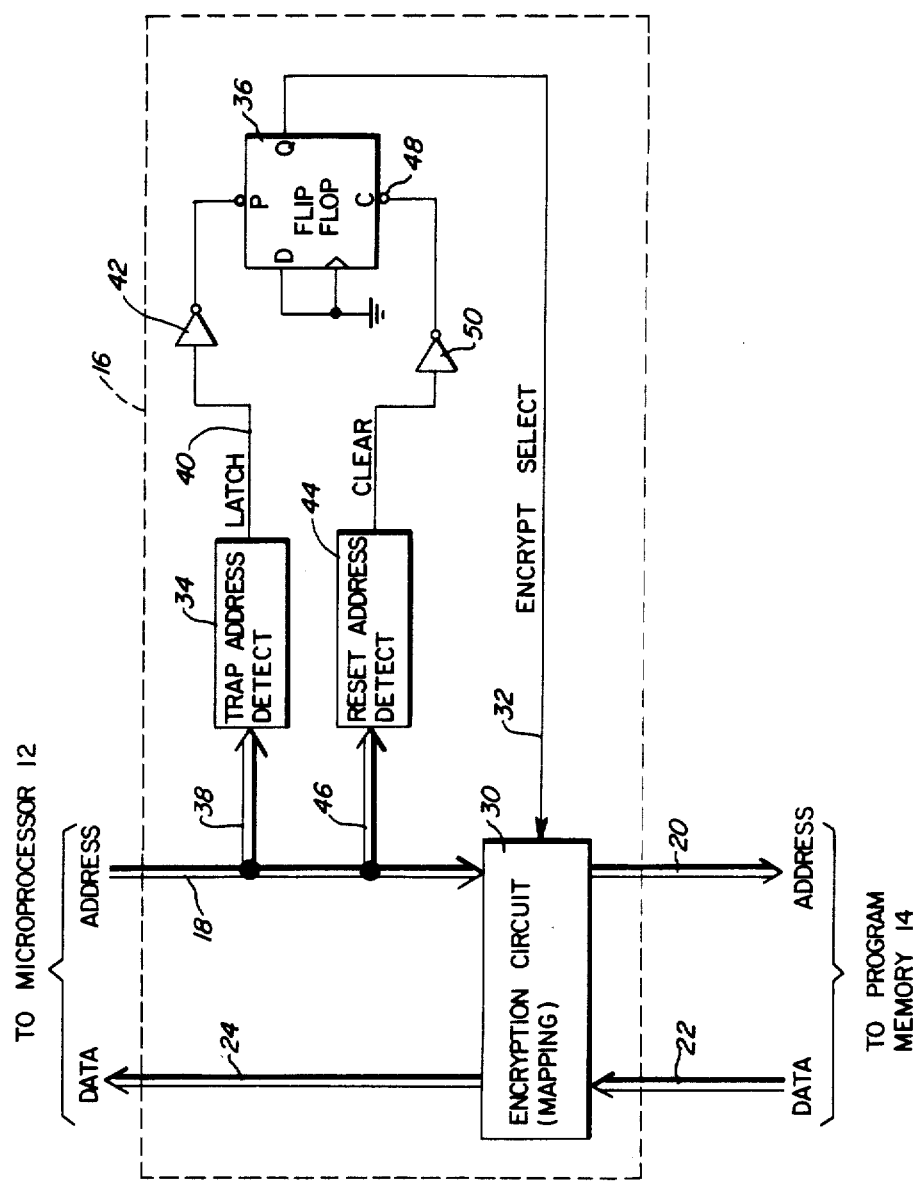
FIG. 2 is a functional block diagram of the protection circuit of FIG. 1.

An understanding of the construction and functioning of a preferred embodiment of the protection circuit 16 may be had by reference to FIG. 2 which depicts in a functional block diagram form the several constituents of circuit 16. More particularly, circuit 16 includes an encryption or mapping circuit 30 having as inputs the address and data buses 18,22 and as outputs the address and data buses 20,24. As will presently be described in greater detail, the illustrated encryption circuit 30 is selectively operable according to one or the other of two different encrypt/decrypt algorithms depending upon the binary state of the signal input to circuit 30 on the encrypt select bus 32. A first predetermined algorithm, corresponding to a first operating mode, is used during normal operation to properly encode and decode the program information in memory 14. The remaining algorithm, corresponding to the second operating mode, occurs whenever the encrypt select bus is activated, for example, by a binary one input on line 32. In such event, the data returned to the microprocessor 12 does not correspond to the decrypted data from memory 14 and the system malfunctions.

The encryption circuit 30 is switched from its first or normal operating mode to the second, invalid operating mode by a detection means 34 and a switching means 36 coupled in serial relation between address bus 18 and the encrypt select bus 32. The detection means 34 monitors at least one of the address and data buses, in the present case address bus 18 via input 38, to detect an invalid program event, i.e., a trap condition. The output signal of the detection means 34 is applied via conductor 40 and as a series connected inverter 42 to one input of a switching means 36 which, as here illustrated, may be a conventional binary flip-flop circuit. The switching means 36 switches the encryption circuit 30 from its first to its second operating mode whenever the inverter 42 applies a low or binary zero input to the flip-flop 36. Such an event occurs in the pesent embodiment when and only when a trap condition in the form of a trap address is sensed by detection means 34.

Since the switching means 36 is bi-stable, the encryption circuit 30 will continue in the second operating mode until and unless it is reset. To this end, there is provided a reset detection means 44 likewise coupled in the present embodiment to the address bus 18 by an input 46. The recognition by the reset detection circuit 44 of a predetermined reset signal on address bus 18 results in a reset signal being applied to the clear or reset input 48 of the switching means 36 through an inverted 50 thereby to reset the encryption circuit 30 to its first operating mode. The reset circuit 44 may be of similar construction and operation as that of the trap address detection circuit 34 excepting that the reset circuit is designed to respond only to a unique signal input.

Figure 3:
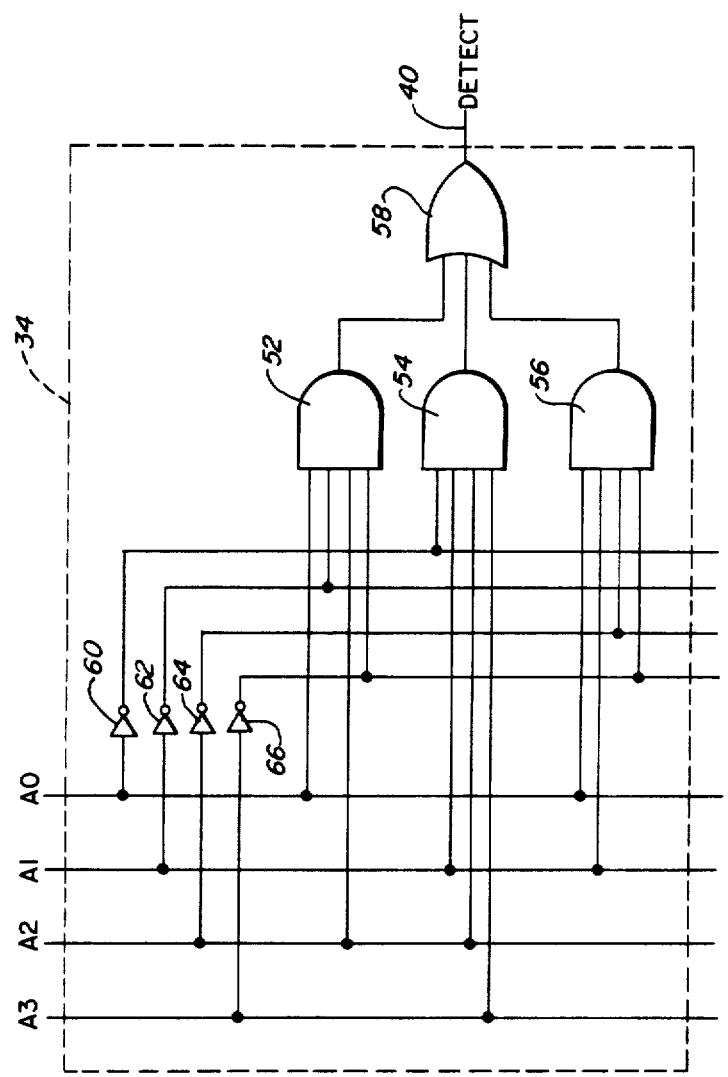
FIG. 3 is a schematic circuit diagram of a preferred embodiment of trap address protection circuit of FIG. 2.

Referring now to FIG. 3, an exemplary form of the detection means 34 of FIG. 2 is illustrated in greater detail. For simplicity, it has been assumed in the present example that the detection performed on four lines of the address bus 18, These four (4) lines are denoted by A0–A3 in the drawing. The number of lines on which the detection function is performed is up to the discretion of the designer. Each of these address lines is selectively coupled as inputs to three AND gates 52, 54 and 56. The singular outputs of each of the AND gates is coupled as an input to a NAND gate 58 whose output constitutes the signal conductor 40. More particularly, the address bus A0 is directly coupled to the AND gates 52 and 56 and by an inverter 60 to the AND gate 54. Address line A1 is directly coupled to AND gates 54 and 56 and by an inverter 62 to the gate 52. Address line A2 is directly coupled to AND gates 52 and 54 and by an inverter 64 to AND gate 56. Finally, address line A3 is directly coupled to AND gate 54 and by an inverter 66 to each of and gates 52 and 56. In the particular detection circuit illustrated, the output 40 is driven to its high or binary one state whenever any of the following three addresses are asserted on the address lines A0–A3; 0101, 1110, and 0011.

If any one of the three (3) addresses above-identified appears on the address lines A0–A3, a latch signal in the form of a bianry zero will be applied to the present input of the switching means 36 thereby to active the encrypt select bus 32. For all other addresses asserted by the microprocessor, the output 40 of the detection means 40 will remain in its non-activated or normal state.

Figure 4:
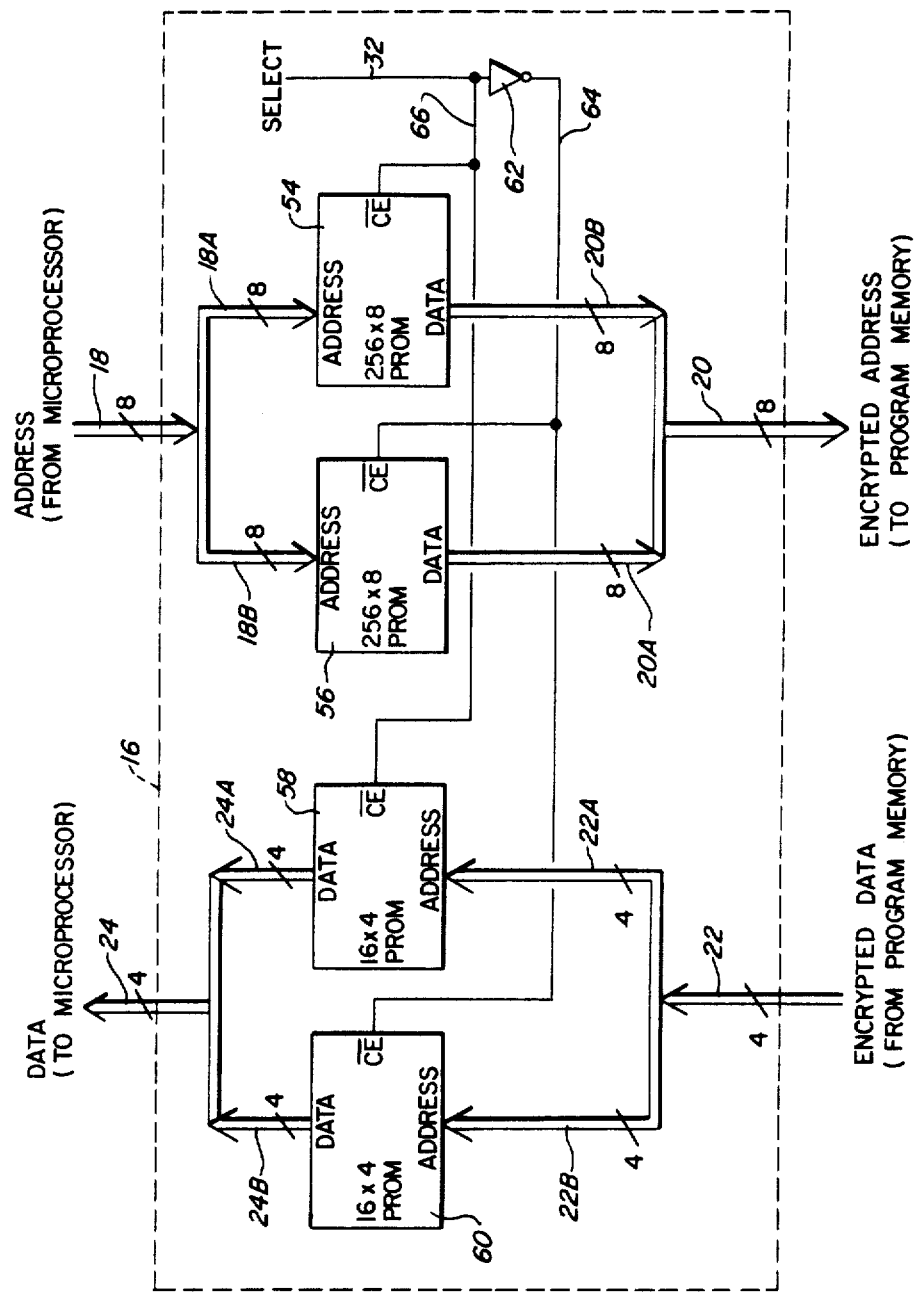
FIG. 4 is a block diagram illustration of the encryption circuit portion of the block diagram of FIG. 2.

Referring now to FIG. 4, there is depicted in diagrammatic form an exemplary encryption/decryption circuit 30. Specifically, in the present embodiment, there is interposed between the address buses 18,20 a pair of parallel PROM-type encoding networks represented by blocks 54 and 56. Networks 54, 56 are coupled respectively between parallel branches 18A, 18B and 20A, 20B of the input and output address buses 18,20.

Similarly, in the present embodiment there are disposed in parallel between data buses 22, 24 a pair of PROM decoding networks 58,60 coupled respectively between parallel branches 22A, 22B and 24A, 24B of the input and output data buses 22,24. Those skilled in the art will appreciate that encryption/decryption networks may be coupled in only one of the address and data buses, instead of both buses as shown.

The two encoding networks 54, 56 are alternatively and selectively operable in response to the binary signal input on encryption select bus 32. To this end, the encryption select bus 32 is coupled to an enabling input of network 56 through and inverter 62 and directly to a like enabling input of network 54 by conductor 66. Enabling inputs of networks 58, 60 are likewise coupled to conductors 66, 64, respectively, such that networks 54, 58 and 56, 60 are always enabled/disabled in unison.

The several encoding/decoding networks may be similar in basic construction, but, of course, are operable according to different preselected algorithms. For instance, the encryption/decryption algorithms may be as simple as swapping two address lines, or substantially more complex, such as one-to-one mapping implemented with a PROM as depicted schematically in FIG. 4. Furthermore, it will be recognized that more than two algorithms could be used in the encryption circuit such that each address location would have more than two data values corresponding to it. A further alternative is to jump between encryption algorithms during normal circuit operation. The switching between algorithms may be done in a predetermined, timed relation to operation of the microprocessor clock. Thus, the first predetermined algorithm may in fact be composed of a complex of sub-algorithms in the general case. Those of ordinary skill in the art will recognize the wide range of conventional alternatives available for implementation of the encoding/decoding networks 54, 56, 58 and 60.

The detection and reset circuits previously discussed may likewise take a wide range of alternative forms consistent with the teachings of the present invention. An attempted assertion of a single, normally unused address location may alone actuate the detection circuit or a more substantial deviation from normal program operation may be utilized. For example, the detection means may "trap" only in response to the assertion or failure to assert a sequence of addresses, and actuation of the "trap" may depend upon either the address combinations or their permutations. Those skilled in the art will appreciate that the detection and reset means may be implemented in the described and other forms by known techniques to satisfy a wide variety of economic constraints and security requirements.

In operation, the microprocessor 12 will communicate with the memory 14 through the protection circuit 16 to effect normal system operation as long as the program proceeds to access address locations and/or return data as contemplated by normal program operation. The encrypted form of the data in the program memory 14 protects against direct copying of the program information, unless the copier also succeeds in reverse engineering of the protection circuit 16. As previously indicated, it is a comparatively simple task to design and to implement the protection circuit 16 in a form that renders it difficult, if not virtually impossible, to reverse engineer.

A momentary deviation from normal microprocessor operation sensed by detection means 34 will latch switch means 36 to an on state thereby to enable encryption select bus 32. An enable signal on bus 32 will switch the encryption/decryption circuit 30 from its first to its second operating mode. Thereafter, only invalid data will be returned to the microprocessor 12. A deviation from normal microprocessor program operation is inevitable when an emulator is substituted for microprocessor 12 in an attempt to "dump" or read the stored program in memory 14.

The protection circuit 16 is reset to its first operating mode only by a predetermined coded input on address bus 18. Thus, once the attempted copying of the program is detected the system is locked into a malfunction mode that effectively prohibits further efforts to decrypt the program memory. The system will continue in its first operating mode until and unless a deviation from normal program operation is again detected.

It will be understood that the invention may be embodied in other specific forms without departing from the spirit or central characteristics thereof. The present embodiments are to be considered as being illustrative and not as being restrictive, and the invention is not to be limited to the details herein but may be modified within the scope of the appended claims.

What is claimed is:

1. The method of inhibiting the unauthorized copying of computer software comprising the steps of:
    (a) storing digital program information in preselected address locations of a memory means in an encrypted form according to a first predetermined algorithm;
    (b) providing a computer processor for performing preselected functions only in response to the decrypted program information stored in said memory means;
    (c) coupling the address and data buses of said computer processor to said memory means through an encryption/decryption means selectively operable in a first mode to encrypt/decrypt said program information according to said first predetermined algorithm and in a second mode to prevent the encryption/decryption of said program information according to said first predetermined algorithm;
    (d) monitoring at least one of the address and data buses to detect trap address information, said trap address information being signified by an attempted accessing of the memory means by an operation not occurring during normal execution of the computer program; and
    (e) switching said encryption/decryption means from said first operating mode to said second operating mode if a trap address is detected by said monitoring means.

2. The method according to claim 1 in which said second operating mode comprises a second predetermined algorithm.

3. The method of claim 1 including the step of designating as trap address information the attempted accessing of certain address locations in said memory means which are not asserted during normal operation of the computer system.

4. The method of claim 1 including the step of designating as trap address information the assertion of a sequence of program address locations that are not asserted in said sequence during normal program operation.

5. The method of claim 1 in which said coupling step includes coupling said computer processor to said memory means through at least two parallel encoding/decoding circuits, only one of which circuits is operable at a time and only one of which circuits is operable according to said first predetermined algorithm.

6. The method of claim 1 including the further step of selectively resetting said encryption/decryption means to said first operating mode in response to a predetermined reset signal.

7. The method of claim 1 in which said switching step includes latching said encryption/decryption means in said second operating mode in response to momentary detection of said trap address.

8. In a computer system including a central processor for performing preselected functions in response to digital program information stored in encrypted form in a memory means, and communicated between said central processor and said memory means on address and data buses, the improvement comprising:
    (a) encryption/decryption means, coupled between said central processor and said memory means, selectively operable in a first mode for encrypting/decrypting said program information according to a first predetermined algorithm and in a second mode according to a second predetermined algorithm for preventing the encryption/decrypting of said program information according to said first predetermined algorithm;
    (b) detection means for monitoring at least one of said address and data buses to detect the attempted accessing of the memory means by an operation not occurring during normal execution of the computer program; and
    (c) switching means for shifting said encryption/decryption means from said first operating mode to said second operating mode in response to detection of said invalid program event.

9. The improvement of claim 8 in which said encryption/decryption means includes parallel encoding/decoding circuits for, respectively, encrypting/decrypting said program information in response to said first and second predetermined algorithms.

10. The improvement of claim 9 in which said detection means includes circuit means for developing an output signal in response to an invalid program event.

11. In the computer system of claim 8, wherein the detection means for monitoring at least one of said address and data buses includes means for detecting the attempted accessing of certain address locations in said memory means which are not asserted during normal operation of the computer program.

12. The computer system of claim 8, wherein the detection means for monitoring at least one of said address and data buses includes means for detecting the assertion of a sequence of program address locations that are not asserted in said sequence during normal program operation.

13. The improvement of claim 10 in which said switching means includes a state circuit means for maintaining said encryption/decryption means in said second operating mode in response to momentary detection of said invalid program event.

14. The improvement of claim 13 and further including reset means for resetting said encryption/decryption means to said first operating mode.

15. The improvement of claim 8 in which said encryption/decryption means comprises a logic array.

16. The method of inhibiting the unauthorized copying of ROM-resident data constituting the audio-visual display information for an electronic video game comprising the steps of:
    (a) storing the audio-visual display information of said electronic video game in encrypted, digital format in a ROM-memory;
    (b) providing a microprocessor, display monitor and sound system for generating the audio-visual display of said game in response to the decrypted program information stored in said memory means;
    (c) coupling said microprocessor to said ROM-memory through an encryption/decryption means selectively operable in a first mode to encrypt/decrypt said audio-visual display information according to a first predetermined algorithm for presenting said game in decrypted audio-visual format and in a second mode to prevent the encryption/decryption of said display information according to said first predetermined algorithm;
    (d) monitoring the digital program information as communicated between said microprocessor and said ROM-memory for identifying an invalid program event, said invalid program event being characterized by the attempted accessing of the memory means by an operation not occurring during normal execution of the computer program; and (e) switching said encryption/decryption means from said first operating mode to said second operating mode in an invalid program event is detected thereby to prevent copying of the encrypted audiovisual information stored in said ROM-memory.

17. A method for inhibiting the use of a microprocessor emulator to read digital program data stored in memory means in a computer system, comprising the steps of:

(a) storing encrypted digital program data into preselected address locations of memory means;

(b) coupling address and data buses of the microprocessor to the memory means through protection circuit means for encrypting, decrypting and monitoring the addressing of the program data stored in the memory means;

(c) monitoring at least one of the address and data buses to detect an attempted invalid accessing of the memory means, the invalid accessing operation being characterized by an operation not occurring during normal execution of the program; and (d) returning falsely decrypted program data through the protection circuit means to the microprocessor emulator in response to the detection of the invalid accessing operation.

18. The method of claim 17 wherein the invalid accessing operation comprises the attempted accessing by the microprocessor emulator of address locations in the memory means not preselected for storing the digital program data.

19. The method of claim 17 wherein the invalid accessing operation comprises the assertion of a sequence of program address locations that are not asserted in the same sequence during normal program execution.

20. The method of claim 17 further including the step of operating the protection circuit means in a first mode to provide true decrypted program data from the memory means to a microprocessor in the absence of the detection of an invalid accessing operation.

21. The method of claim 20 wherein the step of returning falsely decrypted program data to the microprocessor emulator includes operating the protection circuit means in a second mode which prevents true decryption of the program data stored in the memory means.

22. The method of claim 21 wherein the step of monitoring at least one of the address and data buses includes generating a switching signal in response to the detection of the invalid accessing operation by the microprocessor emulator to switch the protection circuit means from the first operating mode to the second operating mode.

23. A method for inhibiting the use of a microprocessor emulator to read digital program data stored in memory means in a computer system employing a microprocessor, comprising the step of:

(a) preselecting less than all available address locations in the memory means for storing program data;

(b) storing encrypted microprocessor program data into the preselected address locations of the memory means;

(c) reserving the unselected address locations in the memory means for use in the detection of sequential accessing of the memory means by the microprocessor emulator;

(d) coupling address and data buses of the microprocessor to the memory means through circuit protection means for monitoring the addressing of address locations in the memory means;

(e) monitoring at least one of the address/data buses to detect the accessing by the microprocessor emulator of at least one of the reserved address locations; and (f) returning false data through the circuit protection means to the microprocessor emulator in response to the detected addressing of any of the reserved address locations in the memory means.

24. The method of claim 23 wherein the step of returning false data to the microprocessor emulator comprises selecting the circuit protection means to invalidity decrypt the encrypted program data before returning the data to the microprocessor emulator.

25. A method for inhibiting the pirating of widely distributed computer software for unauthorized execution on a computer system employing a stock microprocessor, comprising the steps of:

(a) preselecting less than all available address locations in memory means for storing digital program data;

(b) storing digital program data into the preselected address locations in the memory means;

(c) coupling address and data buses of the microprocessor to the memory means through protection circuit means for selectively invalidating the program data;

(d) monitoring the addressing through the protection circuit means of the program data stored in the memory means;

(e) detecting the accessing of other than the preselected address locations in the memory means, thereby indicating an unauthorized attempt to copy the stored program data; and (f) selecting the protection circuit means to return from the memory means invalid program data in response to the detected unauthorized attempt to copy the stored program.

26. The method of claim 25 further comprising the step of encrypting the digital program data before storing the data to the memory means.

27. The method of claim 26 wherein the step of returning invalid program data through the protection circuit means comprises the step of improperly decrypting the encrypted program stored in the memory means.

* * * * *

UNITED STATES PATENT AND TRADEMARK OFFICE
CERTIFICATE OF CORRECTION

PATENT NO. : 4,525,599
DATED : June 25, 1985
INVENTOR(S) : Kevin G. Curran, et al.

It is certified that error appears in the above-identified patent and that said Letters Patent is hereby corrected as shown below:

Column 2, line 21, after "trap" delete --0--.
Column 7, line 40, after "computer" change "system" to --program--.
Column 9, line 7, after "mode" change "in" to --if--.
Column 10, lines 25 and 26, after "means to" change "invalidity" to --invalidly--.

Signed and Sealed this

First Day of October 1985

[SEAL]

Attest:

DONALD J. QUIGG

Attesting Officer

Commissioner of Patents and
Trademarks—Designate